United States Patent
Dixon et al.

(10) Patent No.: US 8,255,294 B2
(45) Date of Patent: Aug. 28, 2012

(54) METHOD AND SYSTEM THAT MONITORS SUPPLY OF PHYSICAL CONSUMABLES RELATIVE TO CONSUMPTION SPECIFICATIONS

(75) Inventors: Mark Dixon, Woodsboro, MD (US); Mark Golczewski, Forest Hill, MD (US)

(73) Assignee: Commercial Fuel Systems, Inc., Mt. Airy, MD (US)

(*) Notice: Subject to any disclaimer, the term of this patent is extended or adjusted under 35 U.S.C. 154(b) by 305 days.

(21) Appl. No.: 12/367,239

(22) Filed: Feb. 6, 2009

(65) Prior Publication Data
US 2010/0205072 A1    Aug. 12, 2010

(51) Int. Cl.
- G06Q 10/00    (2012.01)
- G01M 17/00    (2006.01)
- G06F 7/00    (2006.01)
- G06F 19/00    (2011.01)

(52) U.S. Cl. ............... 705/28; 701/33.4; 701/123
(58) Field of Classification Search ............... 705/28; 701/35, 123, 33.4; 340/995.1
See application file for complete search history.

(56) References Cited

U.S. PATENT DOCUMENTS

| | | | |
|---|---|---|---|
| 4,658,371 A | 4/1987 | Walsh et al. | |
| 5,303,842 A * | 4/1994 | Harp et al. | 220/562 |
| 7,346,449 B2 * | 3/2008 | Sato | 701/123 |
| 7,454,962 B2 * | 11/2008 | Nishiyama et al. | 73/114.52 |
| 2005/0096836 A1 * | 5/2005 | Minami et al. | 701/123 |
| 2007/0152040 A1 | 7/2007 | Call | |
| 2008/0018497 A1 * | 1/2008 | Farnham | 340/995.1 |
| 2008/0319605 A1 * | 12/2008 | Davis | 701/35 |

* cited by examiner

*Primary Examiner* — Matthew Gart
*Assistant Examiner* — Reva R Danzig
(74) *Attorney, Agent, or Firm* — Venable LLP; Robert S. Babayi

(57) ABSTRACT

A method and system for monitoring supply of physical consumables for one or more vehicles receives at an input port supply data associated with a corresponding one of the one or more vehicles. The supply data is originated at a supply device that supplies the physical consumables. Consumption specification data associated with the one or more vehicles are retrieved from a storage device. The consumption specification data is specified by at least one of a vehicle manufacturer or an authority, e.g. a commercial, governmental or military authority. The method and system provides the supply data to a processing unit over a physical transmission medium to determine a variance relative to the consumption specification data.

8 Claims, 4 Drawing Sheets

METHOD AND SYSTEM THAT MONITORS SUPPLY OF PHYSICAL CONSUMABLES RELATIVE TO CONSUMPTION SPECIFICATIONS

FIELD OF THE INVENTION

This invention relates to a supply monitoring system and method, and more particularly, to monitoring supply of physical consumables, such as fuel, to one or more vehicles.

BACKGROUND OF THE INVENTION

According to the Department of Energy, ninety-six percent of the U.S. transportation sector consumes petroleum-based energy sources, two percent uses natural gas energy and another two percent uses renewable energy sources. Given the rising price of and vast need for energy, fuel consumption analysis and prevention of fuel theft has become a growing concern for military, government and commercial entities that manage vehicle fleets. In particular, vehicle fleet managers/owners are concerned with the potential for vehicle operators to "piggy-back" and add fuel intended for personal benefit while having access to fleet resources. Fuel theft is more difficult to detect in a fleet due to the complexity of monitoring the fuel consumption for a large number of vehicles.

U.S. Pat. No. 5,303,842, issued on Apr. 19, 1994 to Harp et al., discloses a fuel meter and theft prevention apparatus that senses and records the amount of fuel added to a vehicle tank. Using the fuel meter, a business can compare the amount of fuel charged to the amount of fuel actually entering the tank. Although this method may be effective, the implementation of fuel meters into each and every fuel tank of an entire vehicle fleet could be costly, time intensive and require frequent maintenance.

U.S. Patent Publication No. 2007/0152040, issued Jul. 5, 2007 to Call, discloses a fuel delivery system that uses an "at-the-pump information retrieval system" to generate a fuel authorization signal when one of the following conditions is present: 1) sufficient funds are available for fuel or 2) sufficient identification has been provided. The fuel delivery system disclosed in this reference is designed to reduce the occurrences of fuel theft. Although this system may prevent unauthorized users from gaining access to fuel supply pumps, it does not prevent fleet vehicle operators from piggy-backing, i.e. adding fuel to additional unauthorized vehicles.

U.S. Pat. No. 4,658,371, issued Apr. 14, 1987 to Walsh et. al., discloses a method to prevent fuel theft and to control maintenance of authorized vehicles through a portable memory unit removably connected to an on-board computer. The on-board computer senses vehicle conditions through transducer carburetor settings. At a fuel dispensing site, a data processing unit receives and stores vehicle condition information relayed through the portable memory unit from the on-board computer. If discrepancies are detected, the operator is notified to immediately take the vehicle to a maintenance facility. However, installation of portable memory units and on-board computers into each and every vehicle of an entire vehicle fleet could be costly, time intensive and require frequent maintenance.

With the increasing price of energy, there is a commensurate need to develop a system and method to monitor supply abuse, in order to save vehicle fleet owners from inaccurate and unjustified operation costs and to increase vehicle operator accountability in fuel use.

SUMMARY

Briefly, according to the present invention, a method and system for monitoring supply of physical consumables, e.g., fuel, oil, etc., for one or more vehicles receives, at an input port, supply data associated with a corresponding one of the one or more vehicles, with the supply data being originated at a supply device that supplies the physical consumables to the one or more vehicles. In one exemplary embodiment, the supply device, fuel pump and supply relates to the amount of supplied fuel to the one or more vehicles. The method and system of the invention retrieves consumption specification data associated with the one or more vehicles from a storage device. The consumption specification data relates to the physical consumables and for example includes specified miles per gallon of fuel consumed for various types of vehicle make or models. The consumption specification data is specified by at least one of a vehicle manufacturer or an authority, e.g., a commercial, governmental or military authority. The method and system of the present invention provides the supply data to a processing unit over a physical transmission medium to determine a variance relative to the consumption specification data.

According to some of the more detailed features of the present invention, the method and system of the present invention compares the variance to a defined consumption criterion in order to produce a comparison result that may for example be used to detect irregularities in the supply of the physical consumables. In one embodiment, the method and system of the present invention outputs data associated with the comparison result, for example, by displaying information associated with the variance or comparison result. Instead of displaying such date, either of the variance or comparison result may be placed on another physical transmission medium for further processing. The comparison result may be derived for a relationship between the actual consumption and a reference consumption data. The reference date may correspond to a parameter that allows distinguishing between regular or irregular supply of consumables to vehicles. The method and system may further perform a function associated with the comparison result, such as communicating an alert message or signal.

BRIEF DESCRIPTIONS OF THE DRAWINGS

The present invention will be more readily understood from the following detailed description when read in conjunction with the accompanying drawings, in which.

DETAILED DESCRIPTION

Figure 1:
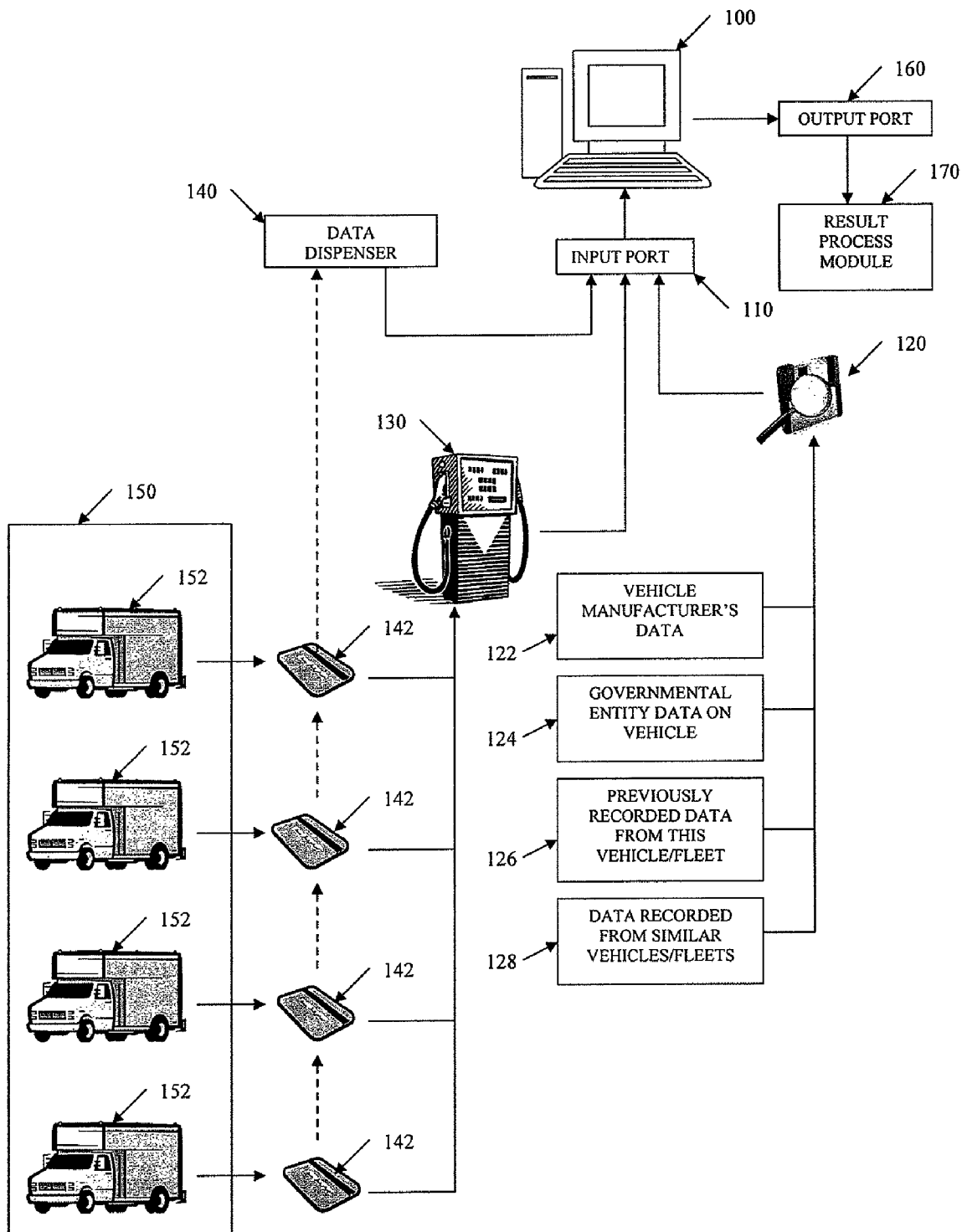
FIG. 1 is an exemplary block diagram of a system according to the present invention.

The present invention relates to a method and system for processing data associated with a physical consumable for one or more vehicles and comparing the results against a consumption specification. In one exemplary application, the present invention may be used to monitor patterns of fuel supply relative to the specification, for example, to detect abuse.

Definitions:

The term "physical consumable" comprises a physical matter that is consumed. Exemplary physical consumables include fuel, wood, coal, oil, gasoline, diesel fuel, natural gas, kerosene, jet fuel, petroleum, bunker fuel, electricity, solid-fuel, bio-fuel or nuclear fuel.

The term "consumption specification data" relates to specified information associated with a physical consumable for a particular vehicle or class of vehicles. For example, the consumption information can be specified by a manufacturer or an authority. Exemplary consumption specification data includes energy consumption data. Exemplary authorities include a commercial entity, a military entity or a governmental entity (local, state or federal). One such authority is the U.S. Department of Energy, which publishes fuel economy specification for vehicles by make, model and year.

The term "fleet" relates to a group or sub-group of one or more vehicles the operations of which are managed by one or more entities, including military, governmental or commercial entities.

The term "fuel" relates to any material that is used to obtain energy.

The term "input port" relates to a physical interface of a computer, network, node or device for the purpose of receiving information.

The term "output port" relates to a physical interface of a computer, network, node or device for the purpose of outputting information for performing a function, for example, displaying information, or for further processing of the information.

The term "physical transmission medium" refers to a wired medium, wireless medium, biological medium or optical medium. Exemplary wired mediums include a physical layer, including a network physical layer or a physical bus structure. Exemplary wireless mediums include those compliant with promulgated standards, for example IEEE 802.1x standards, as well as proprietary wireless standards.

The term "processing unit" comprises a machine, node, device or circuit that manipulates data according to a logic, program, instruction set, etc. Exemplary processing units comprise CPUs, embedded controllers, computers, mainframes, servers, clients, etc.

The term "supply data" relates to information associated with supply of physical consumables, for example supply of fuel to one or more vehicles. Supply data may also be associated with information that identifies vehicles and/or operators, as well as operational information such as odometer readings, date and time of fuel intake and fuel cost.

The term "variance" is a measure of statistical dispersion. An exemplary variance requires averaging the squared distance values from an expected value.

The term "vehicle" relates to any physical transport apparatus, buses, vans, trucks, motorcycles, airplanes, helicopters, ships, boats, trains, spacecraft, including those having commercial, military or government applications.

Method and System Description

FIG. 1 depicts an exemplary block diagram showing the system components of the present invention. In this exemplary diagram, the vehicle fleet 150 consists of one or more groups or sub-groups of vehicles 152. The operator or user of each vehicle uses an access device 142 to access a supply device 130. The supply device 130 supplies physical consumables. Exemplary supply device can be a fuel supply, oil supply, gas supply, nuclear supply, bio fuel supply or an electric supply.

An exemplary access device 142 may be any device, e.g., a card, wired device or wireless device, having the capability of storing and/or communicating supply data, such as vehicle identification, user/operator identification, or other operational data, such as time and date, odometer reading, etc. For example, an access card may store a key that allows the supply device 130 to identify and grant fuel supply access to a vehicle. The access device 142 may store information, such as vehicle identity, operator identity and vehicle characteristics. In one embodiment, upon grant of access to an operator of the vehicle, the supply device 130 allows dispensing of the physical consumable. Once the operator finishes with dispensing the physical consumables, the supply device 130 records and/or communicates the amount of dispensed physical consumable for further processing by the processing unit 100, which receives the supply data via the input port 110. Under this arrangement, the supply device 130 records and/or communicates the supply data directly to the processing unit 100 via the input port 110. Or in another embodiment, the supply device 130 records and/or communicates the supply data directly to a device comprising both an input port and a processing unit. Alternatively, the supply device may record the supply data on the access device 142 itself. In this way, the access device 142 transmits the supply data received from the supply device 130 through a physical transmission medium, for example, a wireless medium, to a data dispenser 140. The data dispenser 140 collects and stores the supply data and access device information and transmits it through physical a transmission medium to the input port 110 of the processing unit 100.

The processing unit 100 retrieves consumption specification data for the vehicle or sub-fleet of vehicles from a storage device 120, which in one exemplary embodiment may comprise one ore more central or distributed databases accessible by the processing unit storing the consumption specification data as well as other access device related data. The consumption specification data may be originated by the vehicle manufacturer or other authority, for example the U.S. Department of Energy. In one embodiment, the storage device 120 provides the consumption specification data in response to a retrieval request from the processing unit 100.

In one exemplary embodiment, the storage device 120 also stores reference consumption data associated with a fleet, sub-fleet, or one or more vehicles as well as groups or sub-groups thereof. The reference consumption data may correspond to data associated with regular consumption of the physical consumables. Such reference consumption data may be used to detect any irregularities in the supply of physical consumables. In another exemplary embodiment, the storage device 120 runs periodic updates to provide the most current and up-to-date consumption specification data and reference consumption data available.

In a further exemplary embodiment, the storage device 120 catalogs the information by vehicle make and model to facilitate efficient retrieval by the processing unit 100. Using this exemplary method, the processing unit 100 may retrieve a specific category of information for a particular vehicle make and model without running an extensive database search.

The processing unit 100 then processes the supply data to determine a variance relative to the consumption specification data. In one embodiment, the processing involves a comparator logic that compares the variance to a reference consumption criterion to produce a comparison result. The reference consumption criteria may be based on the reference consumption data in a way that allows for detection of supply patterns to the one or more vehicles. The result process module 170 is an analysis module that analyzes the data pulled by processing unit 100. The output of the result process module 170 may then be sent to an output port 160 in the form of reports or alerts. The result processing module 170 processes the comparison result according to a specified logic for performing a function, e.g., displaying the variance data or sending an alert message. In a further embodiment, data may be fed into additional analysis modules.

Figure 2:
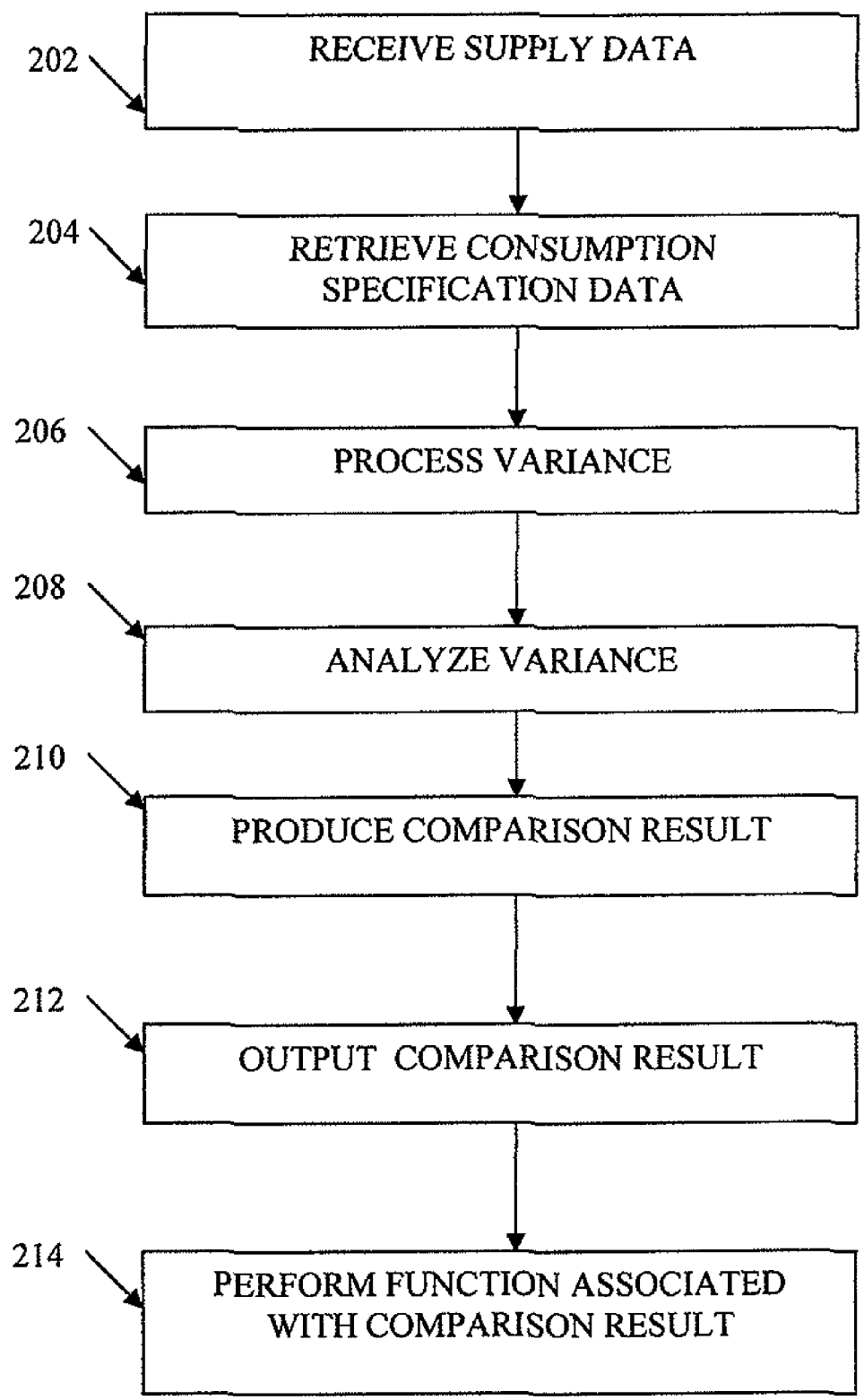
FIG. 2 is an exemplary flow diagram of a method for monitoring supply of physical consumables according to the present invention.

FIG. 2 depicts an exemplary flow diagram of a method for monitoring the supply of physical consumables to one or more vehicles. A processing unit receives through an input port supply data originated at a supply device, block 202. The processing unit then retrieves consumption specification data, for example, from a storage device, block 204. The supply data and consumption specification data are processed to determine the variance of the supply data relative to the retrieved consumption specification data, block 206. The processing unit then analyzes the variance 208 in order to produce a comparison result, block 208 and 210. Based on the comparison result, the processing unit outputs the comparison result, block 212, for performing a function associated with the comparison result, block 214.

In an exemplary embodiment, the processing unit analyzes the variance by determining whether the frequency of fueling matches the fuel consumption and capacity constraints of the particular vehicle. For example, if a small-sized vehicle, used for local transportation, shows 30 gallons of fuel supply for five consecutive days, the processing unit would flag this data for further investigation. In a further exemplary embodiment, the processing unit determines whether to perform a function associated with the comparison result based on a pre-defined abuse recognition standard. For example, a standard could be set that directs the processing unit to provide an abuse alert messages if there are three or more irregular data points for a particular vehicle within a set period of time. Furthermore, there could be varying types of alerts or actions taken depending on the frequency of supply data irregularities. All of the foregoing criteria correspond to exemplary consumption criteria used for producing a comparison result.

Figure 3:
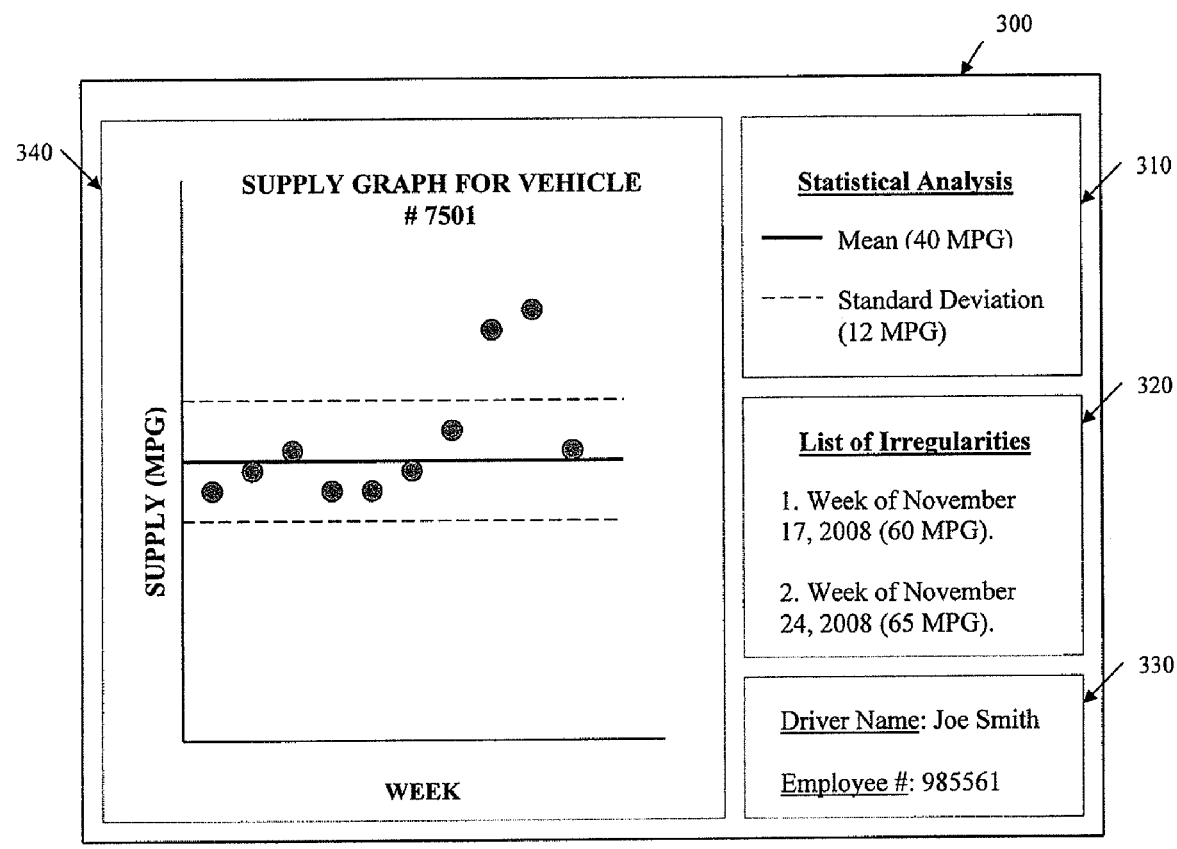
FIG. 3 is an exemplary display of data using the system and method of FIGS. 1 and 2.

In one further exemplary embodiment, outputting the comparison result is in the form of a graphical user interface displayed through the output port of the computing device. FIG. 3 depicts an exemplary diagram displaying variance data produced by the results process module 170 of FIG. 1. The result process module 170 provides a graphical user interface 300 for displaying a statistical analysis interface 310, a list of supply data irregularities 320, a vehicle identification interface 330 and a supply variance graph 340 for visual inspection of supply data points.

Figure 4:
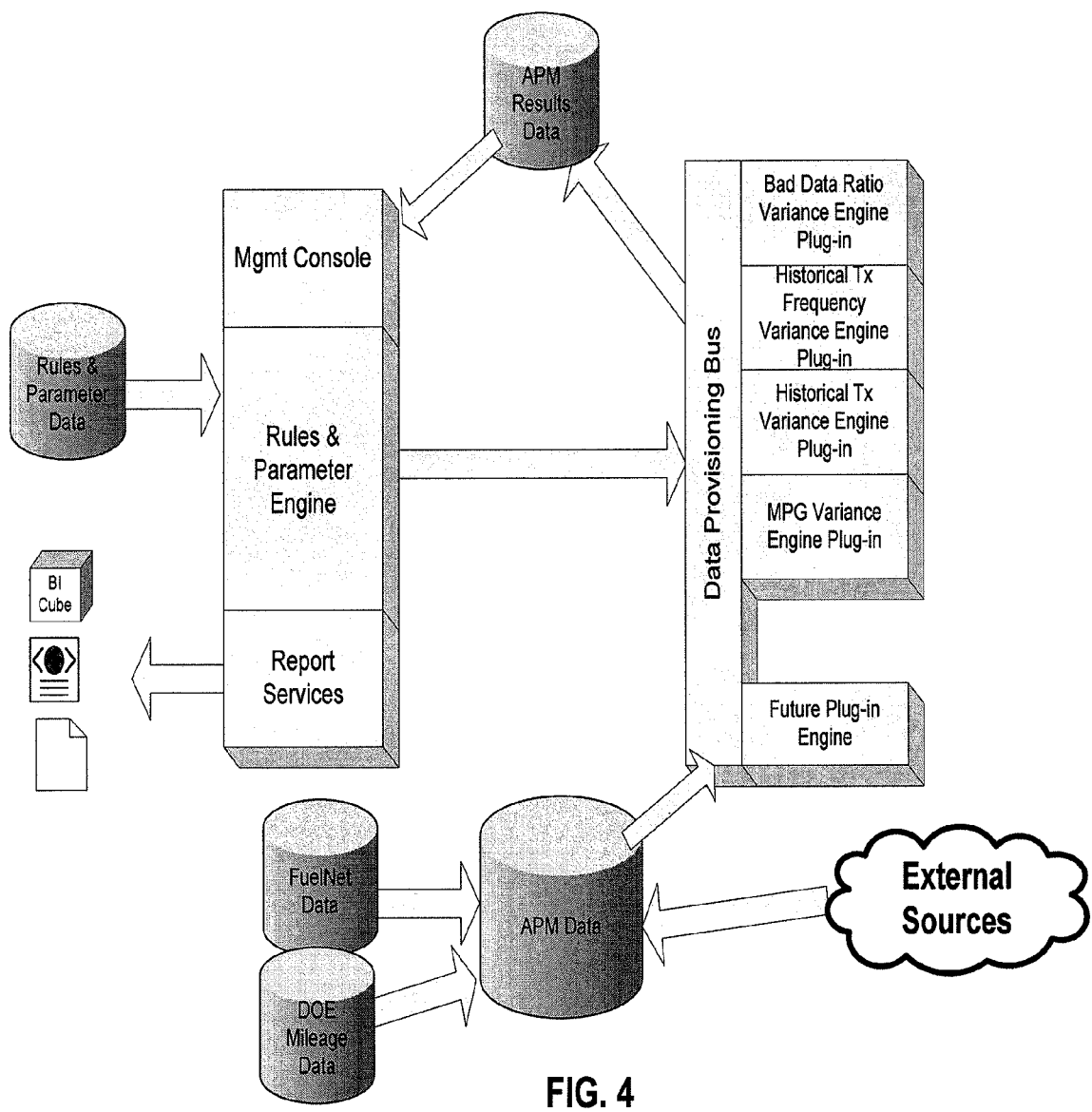
FIG. 4 is a block diagram of an Abuse Pattern Matching (APM) system that applies the present invention for detecting abuses in a fuel supply system.

FIG. 4 is a block diagram of an Abuse Pattern Matching (APM) system that utilizes the present invention to detect irregularities in the supply of fuel to a fleet of cars. The system includes a number of databases that store various data/information and parameters for analysis reporting of abuses in supply of fuels. An access card database, such as FuelNet, stores access card related information for billing etc. A FuelNet database stores FuelNet resides in central data repository. Consumption specification data, such as data promulgated by the Department of Energy (DOE), including vehicle mileage data is stored in another public domain database. Results from analysis reside in a central repository and is used for reporting, dashboard, and tuning and configuration. The system of FIG. 4 uses a plug-in architecture that allows for flexibly applying pattern-matching algorithms. A data provisioning bus provides for accurate and fast data analysis. A Rules $ Parameter Engine defines constraints of analysis for plug-ins. Reports can be generated for analysis in many formats including XML and CSV.

It will be understood that the above description of the present invention is susceptible, to various modifications, changes and adaptations, and that the same are intended to be comprehended within the meaning and range of equivalents of the appended claims.

What is claimed is:

1. A method for monitoring supply of physical consumables for one or more vehicles, the method comprising:
   receiving at an input port supply data associated with a corresponding one of said one or more vehicles, said supply data being originated at a supply device that supplies said physical consumables;
   retrieving consumption specification data associated with said one or more vehicles from a storage device, said consumption specification data being specified by at least one of a vehicle manufacturer or an authority;
   providing said supply data to a processing unit over a physical transmission medium to determine a variance relative to said consumption specification data.

2. The method of claim 1, further comprising comparing said variance to a consumption criterion to produce a comparison result.

3. The method of claim 2, further comprising outputting data associated with said comparison result wherein outputting comprises displaying said comparison result or placing said comparison result on another physical transmission medium for further processing, or performing a function associated with said comparison result.

4. The method of claim 2, wherein said function comprising communicating an alert message.

5. A system for monitoring supply of physical consumable for one or more vehicles, the system comprising:
   an input port for receiving supply data associated with a corresponding one of said one or more vehicles, said supply data being originated at a supply device that supplies said physical consumable;
   a storage device for storing consumption specification data associated with said one or more vehicles, said consumption specification data being specified by at least one of vehicle manufacturer or an authority;
   a processing unit for processing said supply data to determine a variance relative to said consumption specification data.

6. The system of claim 5, further comprising a comparator logic that compares said variance to a consumption criterion to produce a comparison result.

7. The system of claim 6, further comprising an output port that outputs data associated with said comparison result wherein said port is coupled to a display unit for displaying said variance or comparison result or to another physical transmission medium for further processing the variance or comparison result.

8. The system of claim 6, wherein said function comprises communicating an alert message.

* * * * *